United States Patent
Kawai et al.

[11] Patent Number: 6,095,420
[45] Date of Patent: *Aug. 1, 2000

[54] METHOD OF DECODING BAR CODES AND BAR CODE READER

[75] Inventors: Hiroaki Kawai; Shinichi Sato; Motohiko Itoh; Mitsuo Watanabe; Isao Iwaguchi, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/771,254

[22] Filed: Dec. 20, 1996

[30] Foreign Application Priority Data

Dec. 25, 1995 [JP] Japan ..................................... 7-336711

[51] Int. Cl.[7] ..................................................... G06K 7/10

[52] U.S. Cl. ............................ 235/462.16; 235/462.01; 235/462.1; 235/461

[58] Field of Search .................................. 235/462, 461, 235/463, 464, 454, 472, 462.01, 462.1, 462.16, 462.32, 462.25, 462.07, 472.01

[56] References Cited

U.S. PATENT DOCUMENTS

| | | | |
|---|---|---|---|
| 3,684,867 | 8/1972 | Acker | 235/61.11 |
| 5,155,343 | 10/1992 | Chandler et al. | 235/462 |
| 5,196,684 | 3/1993 | Lum et al. | 235/462 |
| 5,241,164 | 8/1993 | Pavlidis et al. | 235/462 |
| 5,521,368 | 5/1996 | Adachi | 235/462 |
| 5,541,395 | 7/1996 | Hill et al. | 235/380 |
| 5,550,365 | 8/1996 | Klancnik | 235/462 |
| 5,719,384 | 2/1998 | Ju et al. | 235/462 |

FOREIGN PATENT DOCUMENTS

| | | |
|---|---|---|
| 0 172 727 A2 | 2/1986 | European Pat. Off. . |
| 1 386 168 | 3/1975 | United Kingdom . |

*Primary Examiner*—Donald Hajec
*Assistant Examiner*—Daniel St. Cyr
*Attorney, Agent, or Firm*—Arent Fox Kintner Plotkin & Kahn PLLC

[57] ABSTRACT

A bar code reader decodes a bar code in different directions if the bar code contains special characters whose bar widths have been corrected. The bar code reader compares the decoded results in the different directions with each other, to improve the bar code reading reliability. If the decoded results agree with each other, the results are accepted, and if not, they are discarded.

11 Claims, 12 Drawing Sheets

Fig.3

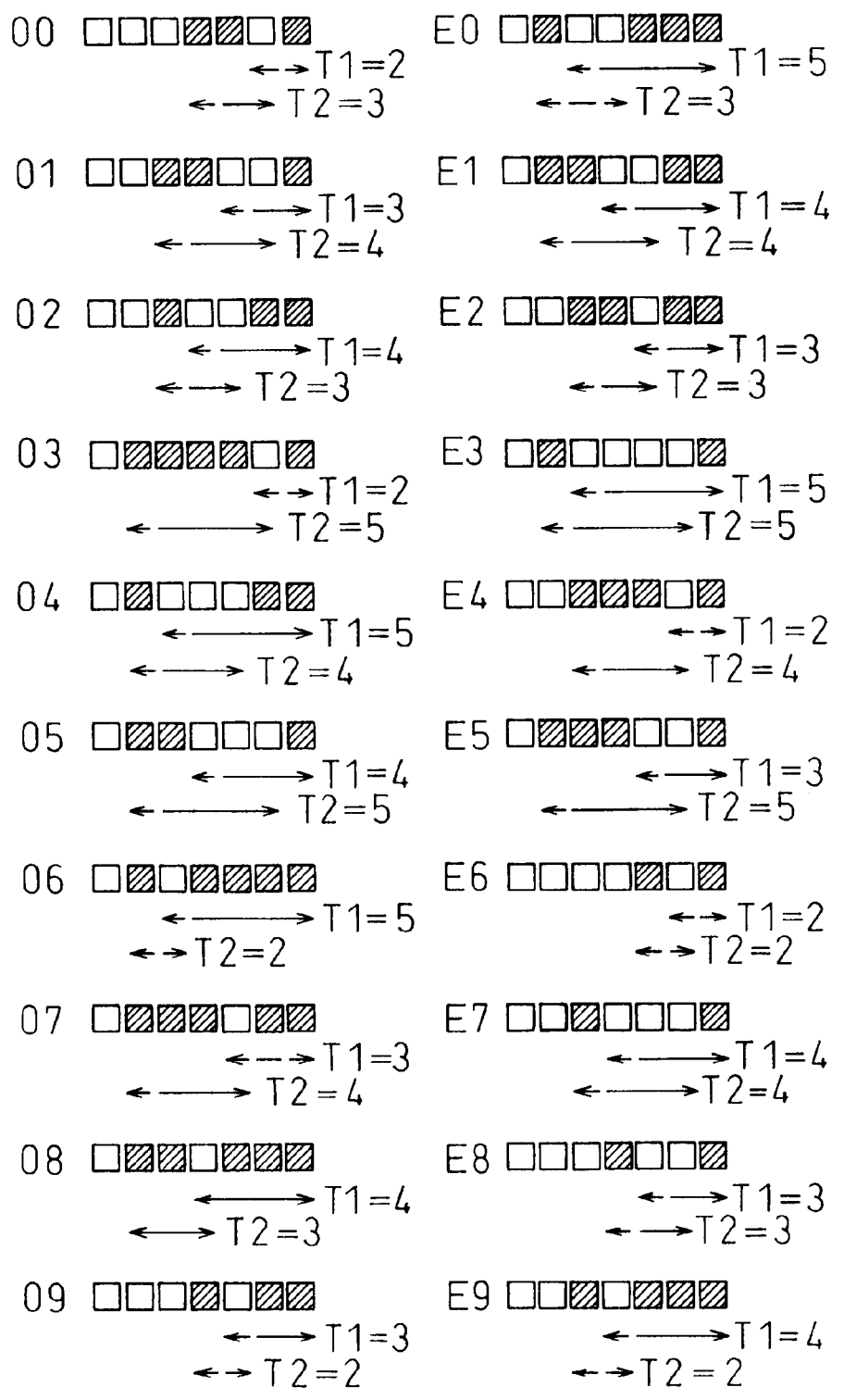

| | | |
|---|---|---|
| 00 | ☐☐☐▨▨☐▨ | T1=2, T2=3 |
| 01 | ☐☐▨▨☐☐▨ | T1=3, T2=4 |
| 02 | ☐☐▨☐☐▨▨ | T1=4, T2=3 |
| 03 | ☐▨▨▨▨☐▨ | T1=2, T2=5 |
| 04 | ☐▨☐☐☐▨▨ | T1=5, T2=4 |
| 05 | ☐▨▨☐☐☐▨ | T1=4, T2=5 |
| 06 | ☐▨☐▨▨▨▨ | T1=5, T2=2 |
| 07 | ☐▨▨▨☐☐▨ | T1=3, T2=4 |
| 08 | ☐▨▨☐▨▨▨ | T1=4, T2=3 |
| 09 | ☐☐☐▨☐▨☐ | T1=3, T2=2 |
| E0 | ☐▨☐☐▨▨▨ | T1=5, T2=3 |
| E1 | ☐▨▨▨☐▨▨ | T1=4, T2=4 |
| E2 | ☐☐▨☐☐▨▨ | T1=3, T2=3 |
| E3 | ☐▨☐☐☐☐▨ | T1=5, T2=5 |
| E4 | ☐☐▨▨▨▨☐▨ | T1=2, T2=4 |
| E5 | ☐▨▨☐☐☐▨ | T1=3, T2=5 |
| E6 | ☐☐☐☐▨☐▨ | T1=2, T2=2 |
| E7 | ☐☐▨☐☐☐▨ | T1=4, T2=4 |
| E8 | ☐☐☐☐▨☐☐ | T1=3, T2=3 |
| E9 | ☐☐▨☐▨▨▨ | T1=4, T2=2 |

① NORMAL BLACK BAR

② THICK BLACK BAR

③ THIN BLACK BAR

Fig.5

| T1\T2 | 2 | 3 | 4 | 5 |
|---|---|---|---|---|
| 2 | E6 | 00 | E4 | 03 |
| 3 | 09 | E2 / E8 | 01 / 07 | E5 |
| 4 | E9 | 02 / 08 | E1 / E7 | 05 |
| 5 | 06 | E0 | 04 | E3 |

Fig.6

| B1\B3 | 1 | 2 | 3 |
|---|---|---|---|
| 1 | E7 / E8 | 01 | — |
| 2 | 02 | E1 / E2 | 07 |
| 3 | — | 08 | — |

METHOD OF DECODING BAR CODES AND BAR CODE READER

BACKGROUND OF THE INVENTION

1. Field of the Invention

The present invention relates to a method of decoding bar codes and a bar code reader.

Many shops and supermarkets employ POS systems which include bar code readers. The bar code readers must read bar codes whose printed quality is not always good. Some bars of a bar code are thicker or thinner than standard widths, patchy, or partly broken due to poor printing quality. The bar code readers are required to read such poor-quality bar codes correctly.

2. Description of the Related Art

A UPC bar code is composed of start guard bars, center bars, and end guard bars. The center bars divide the bar code into two parts. A part between the start guard bars and the center bars is a left block, and a part between the center bars and the end guard bars is a right block. Each of the left and right blocks consists of six characters, and therefore, each bar code contains 12 characters. A photosensor for a bar code reader provides an electric signal representing "1" in response to reflected light from a black bar of the bar code, and an electric signal representing "0" in response to reflected light from a white bar of the bar code.

Each character of the bar code consists of two white bars and two black bars, and each character extends for seven modules. The module is a unit used to express the width of each bar of the bar code. The width of each white or black bar is an integral number of modules.

Each character of the bar code represents one of numerals 0 to 9 depending on the widths of the white and black bars of the character. Since each character consists of seven modules, the characters are classified into two groups. In one group, the total number of modules of the two black bars of each character is even, and in the other group, the same is odd. Consequently, each UPC bar code is able to express 20 characters, i.e., even-0 (E0) to even-9 (E9) each including an even number of black modules, and odd-0 (O0) to odd-9 (O9) each including an odd number of black modules, as shown in FIG. 3. The two character groups are used to distinguish, for example, the left and right blocks of the bar code from each other.

The bar code reader emits a scan beam toward a bar code and receives a beam reflected from the bar code. The bar code reader compares the intensity of the reflected beam with a reference value and provides an electric signal representing 1 or 0. A decoder of the bar code reader decodes the electric signal into one of E0 to E9 and O0 to O9 according to the level (1 or 0) and duration of the electric signal.

Each bar of the bar code is frequently too thin or too thick depending on printing conditions. The bar code reader is unable to test the printing conditions, and therefore, may erroneously read the bar code that is poorly printed if the bar code reader directly reads the width of each bar of the bar code.

To solve this problem, there is a bar code decoding method that cancels the influence of thicker and thinner bars when reading a bar code. This method measures the widths T1 and T2 of adjacent two pairs of black and white bars of the bar code as shown in FIG. 2.

The widths T1 and T2 are called delta distances. There are 20 characters ranging from E0 to E9 and O0 to O9 to be expressed in a bar code. On the other hand, there are four delta distances ranging from two to five modules to provide 16 combinations of T1 and T2. As a result, the characters E1 and E7 provide the same combination of T1 and T2. Similarly, E2 and E8, O1 and O7, and O2 and O8 provide the same combinations of T1 and T2, respectively. For these characters, the delta distances T1 and T2 are insufficient to distinguish them from one another.

The characters having the same combination of T1 and T2 have, however, different number of modules in individual bars. Accordingly, members of any one of the pairs E1 and E7, E2 and E8, O1 and O7, and O2 and O8 can be distinguished from each other by measuring the bars of the pair.

Here rises another problem that each bar of the pairs may also be thin or thick depending on printing conditions.

Then, measuring the widths of bars is insufficient to distinguish characters, for example, E1 and E7, having the same delta distances T1 and T2.

To solve this problem, there is a method of correcting the width of a bar of a character to be decoded, according to the width of a bar of the character that has already been decoded.

There is another method that sets an allowable error range for the width of a bar, determines whether or not each bar is within the range, and only when the bar is within the range, decodes the bar code.

If each bar has a large error, the allowable error range is expanded, to properly decode bar codes depending on situations.

This method, however, is complicated and is not preferable. There is no way to determine whether or not a corrected bar width is true. If the corrected bar width is wrong, the bar code reader will provide an incorrect result.

Recent bar codes are compact, short, and simply printed, and bar code readers are required to correctly read these bar codes.

SUMMARY OF THE INVENTION

An object of the present invention is to provide a method of decoding bar codes and a bar code reader capable of correctly reading bar codes that require width corrections.

In order to accomplish the object, the present invention provides a method of decoding a bar code according to reflected light from the bar code, including the steps of detecting bar code data in the reflected light, storing the bar code data in a storage unit, reading and decoding the bar code data in a first direction, reading and decoding the bar code data in a second direction, and determining whether or not the decoded results in the first and second directions are equal to each other.

The present invention also provides a method of decoding a bar code according to reflected light from the bar code, including the steps of detecting bar code data in the reflected light, storing the bar code data in a storage unit, reading and decoding the bar code data in a first direction, reading and decoding the bar code data in a second direction if the decoded result in the first direction includes special data, and determining whether or not the decoded results in the first and second directions are equal to each other. The special data relates to a character whose bar width is corrected, before decoding the character, in each of the first and second directions according to the bar width of a character already decoded in each direction.

The corrected bar widths or decoded results in the two directions are compared with each other to determine whether or not they are equal to each other. If they are equal to each other, they are accepted as correct. If they are not equal to each other, at least one of them is wrong.

The present invention also provides a method of decoding a bar code according to reflected light from the bar code, including the steps of detecting bar code data in the reflected light, storing the bar code data in a storage unit, reading and decoding the bar code data in a first direction, reading and decoding the bar code data in a second direction if the decoded result in the first direction includes consecutive special data, and determining whether or not the decoded results in the first and second directions are equal to each other.

The special data relates to characters whose bar widths are corrected, before decoding the characters, in each of the first and second directions according to the bar width of a character already decoded in each direction.

The present invention also provides a method of decoding a bar code according to reflected light from the bar code, including the steps of detecting bar width data of the bar code in the reflected light, storing the bar width data in a storage unit, reading the bar width data in a first direction and decoding the same into a first character, and determining whether or not a bar width of a second character decoded just before the first character had been corrected according to a bar width of a third character decoded just before the second character. If the bar width of the second character had been corrected according to the bar width of the third character, the method corrects the bar width of the second character according to a bar width of the first character, again decodes the second character, and determines whether or not the two decoded results of the second character are equal to each other.

BRIEF DESCRIPTION OF THE DRAWINGS

The present invention will be more clearly understood from the description as set forth below with reference to the accompanying drawings, in which:

FIG. 3 shows characters O0 to O9 and E0 to E9 of the UPC bar code;

FIG. 5 is a table showing delta distances and corresponding characters;

FIG. 6 is a table used to decode characters 1, 2, 7, and 8 of the UPC bar code;

DESCRIPTION OF THE PREFERRED EMBODIMENTS

For a better understanding of the preferred embodiments of the present invention, the problems in the prior art will be explained.

Figure 1:
FIG. 1 shows an example of a UPC bar code.

FIG. 1 shows an example of a UPC bar code. The bar code has start guard bars 53, end guard bars 54, and center bars 55.

A part between the start guard bars 53 and the center bars 55 is a left block, and a part between the center bars 55 and the end guard bars 54 is a right block.

Each of the left and right blocks consists of six characters, and therefore, each bar code contains 12 characters.

Figure 2:
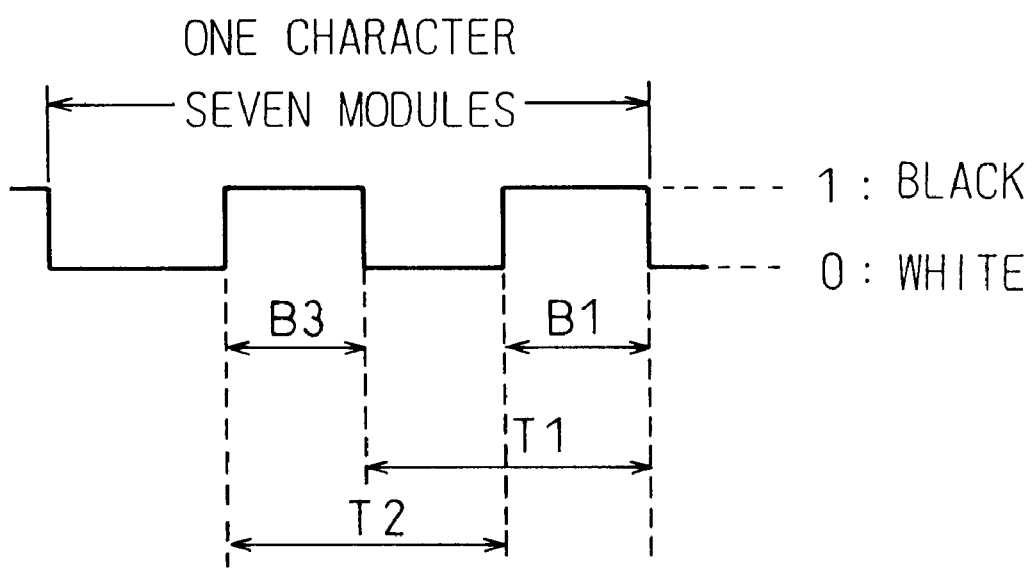
FIG. 2 shows an example of a character of the UPC bar code.

FIG. 2 shows an example of a character of the UPC bar code. A photosensor of a bar code reader provides an electric signal representing "1" in response to reflected light from a black bar of the bar code, and an electric signal representing "0" in response to reflected light from a white bar of the bar code.

Each character of the bar code consists of two white bars and two black bars. The width of each character is seven modules. The module is a unit used to express the width of each bar of the bar code. The width of each white or black bar must be an integral number of modules.

The start guard bars 53 include two black bars and a white bar sandwiched between the black bars, each bar having a width of one module. The end guard bars 54 have the same formation. The center bars 55 consist of three white bars and two black bars each having a width of one module. These bars are arranged in order of white, black, white, black, and white.

Each character of a bar code represents any one of numerals 0 to 9 depending on the widths of the white and black bars of the character. Since each character consists of seven modules, the characters are classified into two groups. In one group, the total number of modules of the two black bars of each character is even, and in the other group, the same is odd. Accordingly, a UPC bar code is able to express 20 characters, i.e., even-0 (E0) to even-9 (E9) each including an even number of black modules, and odd-0 (O0) to odd-9 (O9) each including an odd number of black modules, as shown in FIG. 3. The two character groups are used to distinguish, for example, the left and right blocks of the bar code from each other.

In FIG. 3, the right part shows E0 to E9, and the left part shows O0 to O9. Each bar of each of these numerals consists of a specified number of modules.

The bar code reader emits a scan beam toward a bar code and receives a reflected beam from the bar code. The bar code reader compares the intensity of the reflected beam with a reference value and provides an electric signal representing 1 or 0 (FIG. 2). A decoder of the bar code reader decodes the electric signal into one of E0 to E9 and O0 to O9 according to the level (1 or 0) and duration of the electric signal.

Any one of E0 to E9 and O0 to O9 of FIG. 3 of a given bar code is distinguishable according to reflected light from the bar code because each has a different structure of black and white bars. Consequently, each character in the bar code is decoded.

Figure 4:
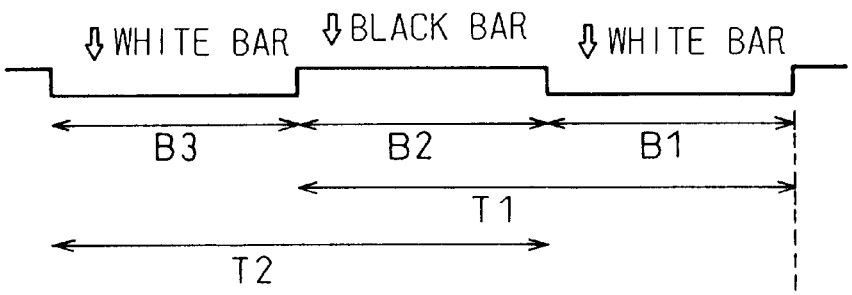
FIG. 4 shows a normal bar code, a thickened bar code, and a thinned bar code.
Figure 4:
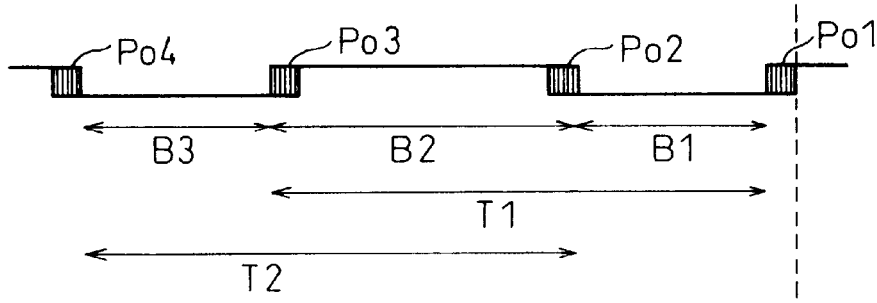
Figure 4:
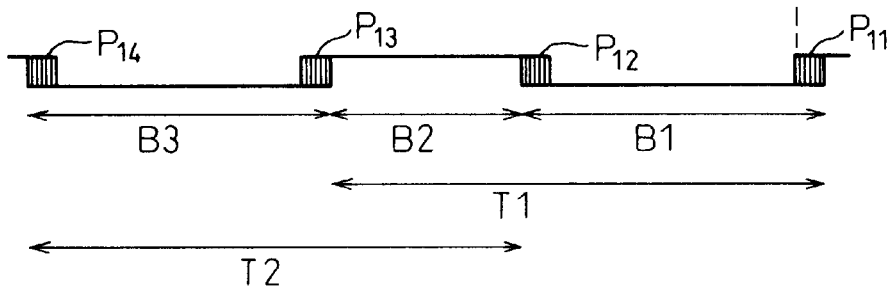

Bars of bar codes are frequently thinned or thickened depending on printing conditions as shown in FIG. 4. FIG. 4 shows two white bars and one black bar each consisting of the same number of modules. In FIG. 4(1), the bars are normally printed. In FIG. 4(2), the black bar is thick. In FIG. 4(3), the black bar is thin.

In FIG. 4(1), the white bars B1 and B3 and black bar B2 are correctly printed with a normal width, and therefore, the bar code reader will correctly read these bars.

In FIG. 4(2), the black bar B2 is thickened by "P0×2" from the normal width. As a result, each of the white bars B1 and B2 is thinned by the same portion from the normal width. In FIG. 4(3), the black bar B2 is thinned by "P1×2" from the normal width, and each of the white bars B1 and B2 is thickened by the same portion from the normal width.

The bar code reader is unable to test the printing conditions, and therefore, may incorrectly read the bar code that has the incorrectly printed bars of FIGS. 4(2) and 4(3), if the bar code reader directly reads the width of each bar of the bar code.

A prior art for correctly reading a bar code having thinned or thickened bars will be explained with reference to FIG. 4.

A delta distance T1 is the total width of the black bar B2 and white bar B1, and a delta distance T2 is the total width of the white bar B3 and black bar B2.

Reading the bar code having thickened black bars will be explained with reference to FIG. 4(2). If each of the bars uniformly has a printing error, a thick portion P01 of a black bar adjacent to the white bar B1 is nearly equal to a thick portion P03 on the left side of the black bar B2, and therefore, P01 and P03 cancel each other. Accordingly, the delta distance T1 is nearly equal to the total of the normal black bar B2 and normal white bar B1. A thick portion P02 of the black bar B2 never affects the delta distance T1. Namely, the delta distance T1 is substantially free from the thick portions.

Similarly, the delta distance T2 is nearly equal to the total of the normal black bar B2 and normal white bar B3 because thick portions P02 and P04 cancel each other.

In FIG. 4(3), thin portions P11 and P13 in a delta distance T1 cancel each other, and thin portions P12 and P14 in a delta distance T2 cancel each other.

Accordingly, the delta distances T1 and T2 are free from the thin portions. Namely, the delta distances T1 and T2 are substantially unchanged in the cases (1), (2), and (3) of FIG. 4. The prior art uses such delta distances to decode a given bar code.

FIG. 3 shows the delta distances of each of the 20 characters of UPC bar codes. Each character consists of seven modules, and the width of each bar is at least one module. This means that each delta distance is in the range of two to five modules. FIG. 5 is a table showing the delta distances T1 and T2 of each of the 20 characters, i.e., E0 to E9 and O0 to O9. To decode a bar code, the delta distances T1 and T2 of each character of the bar code are measured, and the character is decoded according to the table of FIG. 5.

As explained above, bar codes are able to express the 20 characters of E0 to E9 and O0 to O9. On the other hand, there are four delta distances ranging from two to five modules to provide 16 combinations of T1 and T2. As a result, the characters E1 and E7 have the same combination of T1 and T2. Similarly, E2 and E8, O1 and O7, and O2 and O8 have the same combinations of T1 and T2, respectively. Accordingly, the delta distances T1 and T2 are insufficient to distinguish the two characters of each of these pairs from each other.

The characters having the same combination of T1 and T2 have, however, different number of modules in individual bars. Accordingly, the characters of any one of the pairs E1 and E7, E2 and E8, O1 and O7, and O2 and O8 can be distinguished from each other by measuring one of the bars of the pair.

FIG. 6 shows a table used to identify each character of these pairs. For example, the characters E2 and E8 having the same delta distances T1 and T2 of each 3 are distinguished from each other according to the table of FIG. 6.

If the detected delta distances T1 and T2 are each 3, the corresponding character must be E2 or E8. Accordingly, the widths of two black bars B1 and B3 (FIG. 2) are measured, and the table of FIG. 6 is referred to, to select one of E2 and E8.

If the character is E2, each of the black bars B1 and B3 have two modules. If it is E8, each of the black bars B1 and B3 have one module. In this way, any one of the two characters having the same delta distances T1 and T2 is identifiable.

This method, however, has a problem.

To distinguish two characters having the same delta distances from each other, it is necessary to measure the widths, i.e., the numbers of modules of specific bars. These bars are naturally thinned or thickened depending on printing conditions. For example, the character E2 has two black bars each having a width of two modules. If these black bars thinned each to one module due to poor printing conditions, the bar code reader may read the character as E8.

In this way, it is impossible to eliminate the influence of printing errors when distinguishing two characters having the same delta distances from each other.

To solve this problem, another method corrects the width of each bar of a given character according to the widths of bars of the preceding character already decoded, and then, decodes the given character.

Figure 7:
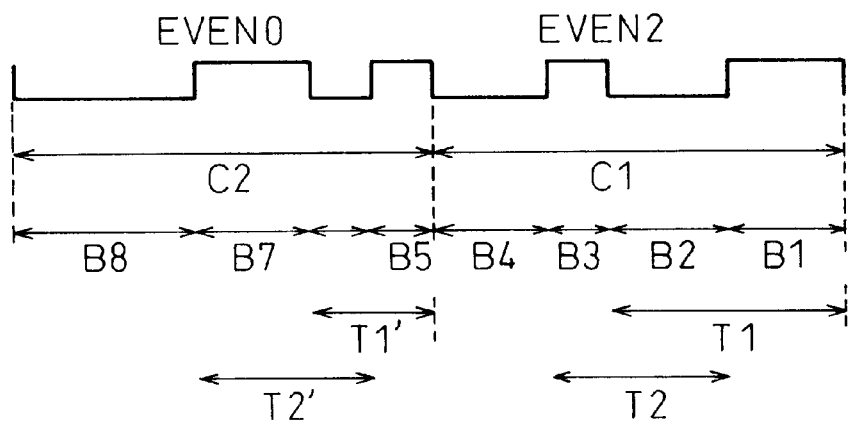
FIG. 7 shows a bar width correction.

FIG. 7 explains this method.

A character of E0 is in front of a character of E2 and is already decoded. To decode E2, black bars B3 and B1 of E2 must be measured. These black bars may involve printing errors. Since E0 is already decoded, the numbers of modules of the black and white bars of E0 are known.

To correct the width of the black bar B3 of E2, the width of the black bar B5 or B7 of E0 is subtracted from the width of the black bar B3. The width of the black bar B5 or B7 is known and involves the printing errors. Accordingly, subtracting the width of the black bar B5 or B7 from the width of the black bar B3 cancels the printing errors in the black bar B3. If the black bar B5 is subtracted from the black bar B3, the difference will be "0" because each has a width of one module. If the black bar B7 is subtracted from the black bar B3, the difference will be "−1."

Thereafter, the difference is added to the normal number of modules of B5 or B7 of E0. The normal module number involves no printing error. In this way, the width of the black bar B3 is correctly measured. Similarly, the width of the black bar B1 of the character E2 is correctly measured.

The character E2 with the corrected bar widths is correctly decoded irrespective of the printing errors.

It is impossible, however, to determine whether or not the character in front of the character E2 is surely E0, or whether or not the number of modules of the black bar B5 or B7 is correct. The method decodes the character E2 on the assumption that the character E0 decoded before E2 is correct. If this assumption is wrong due to broken bars, etc., the character E2 will not correctly be decoded. There is no way to test whether or not the decoded character E0 is correct, or whether or not the bars of the character E2 have really been corrected.

If the bar code is printed on a curved surface, the ratio of the character E0 to the character E2 will not be 1:1. Then, correcting the widths of bars of the character E2 according to those of the character E0 will provide a wrong result.

To solve this problem, there is a method that sets an allowable error range for the width of a bar, determines whether or not each bar is within the range, and only when the bar is within the range, decodes a corresponding bar code.

If each bar has a large error, the allowable error range is expanded, to properly decode bar codes according to situations.

This method, however, is complicated and is not preferable.

In addition, this method is unable to determine whether or not a given bar width is true. If it is wrong, the bar code reader will provide a wrong result.

Recent bar codes are compact, short, and simply printed, and bar code readers are required to correctly read these bar codes.

Next, preferred embodiments of the present invention will be explained.

Figure 8:
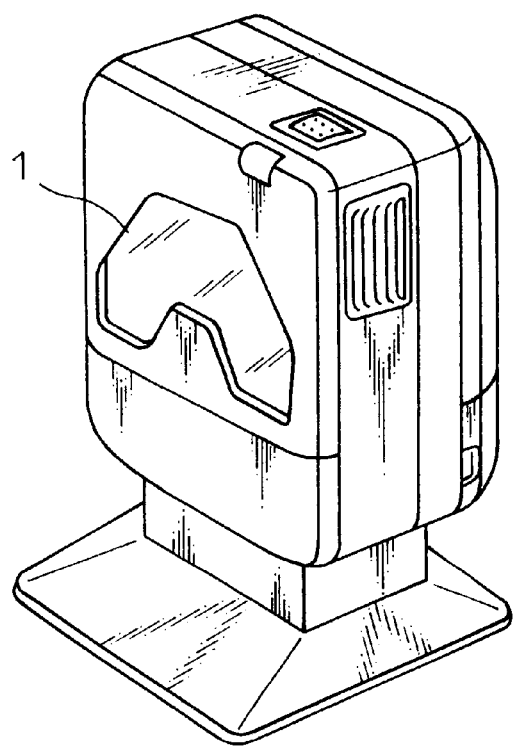
FIG. 8 shows an example of a bar code reader.

FIG. 8 shows an example of a bar code reader. This is of a stationary type fixed on, for example, a cashier's counter of a store.

The bar code reader has a window 1 that emits laser beams in different downward directions.

Figure 9:
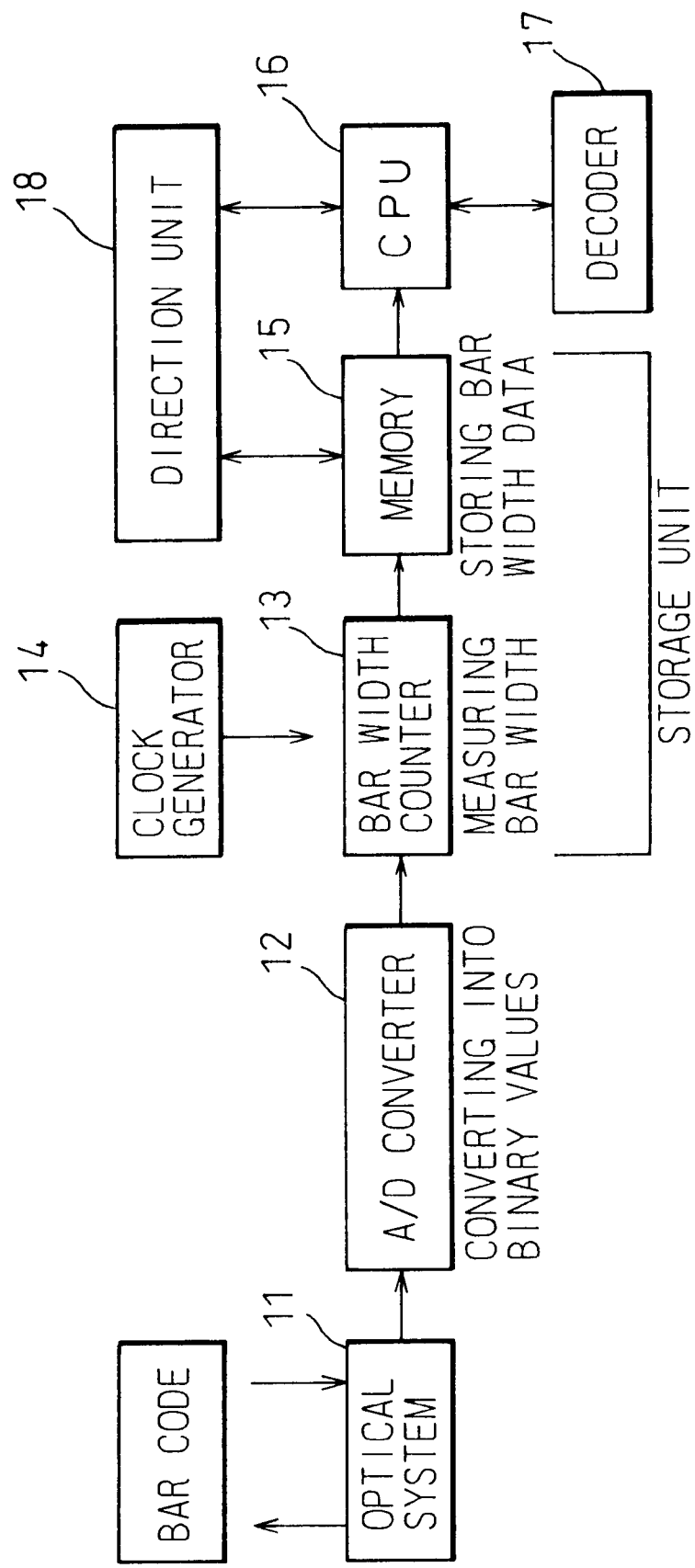
FIG. 9 is a block diagram showing a bar code reader according to an embodiment of the present invention.

FIG. 9 is a block diagram showing a signal processing system of a bar code reader according to an embodiment of the present invention. An optical system 11 includes a light source such as a semiconductor laser, a mirror for reflecting a beam from the light source, a polygon mirror for providing a scanning beam according to the reflected beam, a window for emitting the scanning beam, and a photosensor for receiving reflected beam from a bar code. The photosensor provides an analog electric signal representing a value corresponding to a black or white bar of the bar code.

An A/D converter 12 converts the analog electric signal into a digital electric signal representing a value of 1 or 0. A width counter 13 counts a period between edges of the output of the A/D converter 12 according to a clock signal provided by a clock generator 14. Namely, the width counter 13 measures the width of a black or white bar of the bar code.

A memory 15 stores the output of the width counter 13. When a scanning operation is complete, a CPU 16 reads the bar widths out of the memory 15, and a decoder 17 decodes the bar widths into bar code characters.

A direction unit 18 determines a direction in which the width data in the memory 15 is read and decoded.

Figure 10:
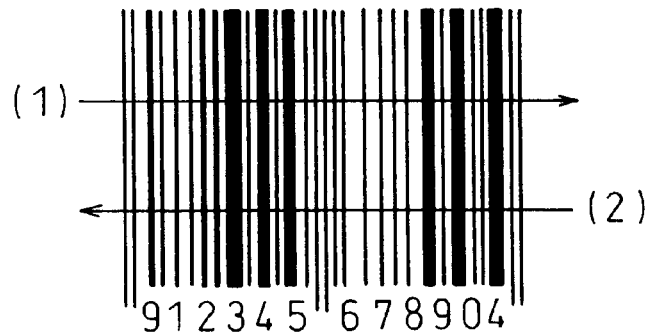
FIG. 10 shows decoding directions of a bar code.

FIG. 10 shows a bar code and bar code decoding directions. The bar code reader according to the present embodiment first decodes the bar code in the direction (1), and if necessary, in the direction (2), too. Namely, the bar code data stored in the memory 15 is first read in the direction (1) and decoded in the some direction then the same bar code data is read in the direction (2) and decoded in the same direction. The direction unit 18 determines one of the directions (1) and (2).

Figure 11:
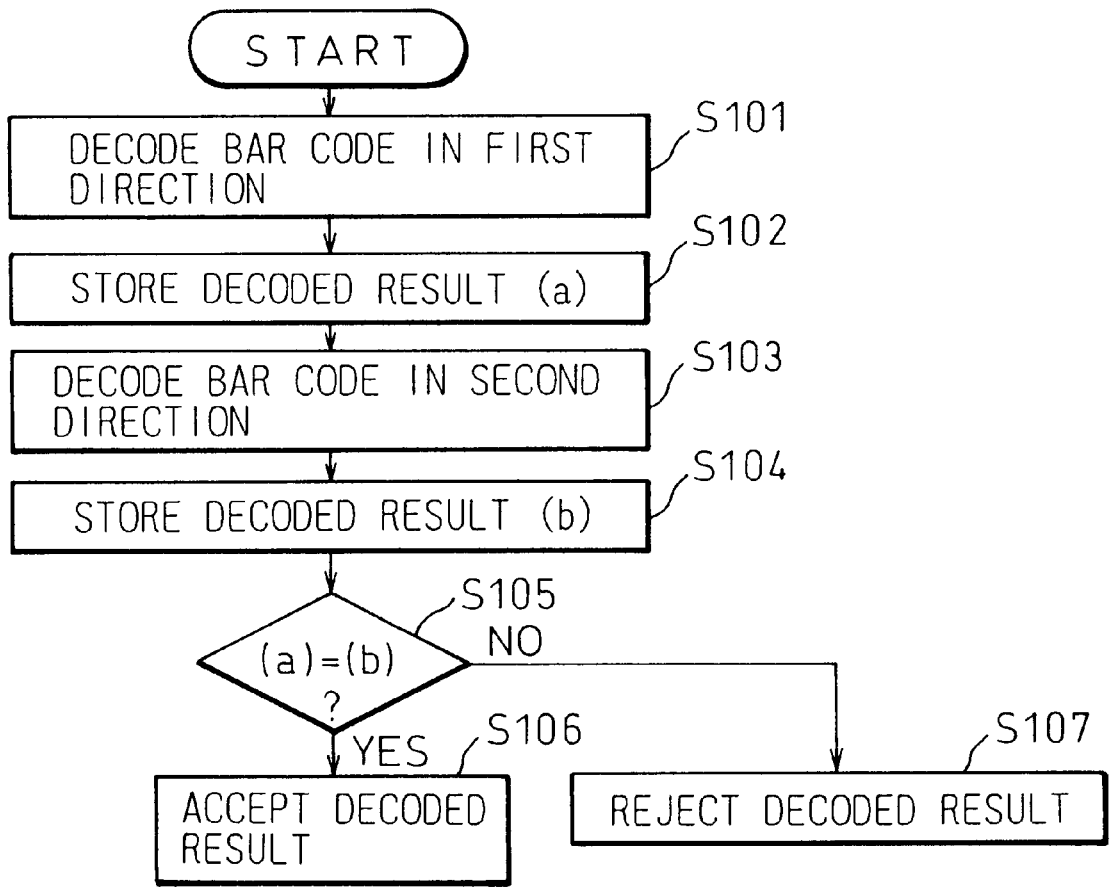
FIG. 11 is a flowchart showing a bar code decoding routine according to a first embodiment of the present invention.

FIG. 11 is a flowchart showing a bar code decoding routine according to a first embodiment of the present invention. This routine is carried out after the bar code reader reads a bar code and the memory 15 stores bar width data. Step S101 reads the bar width data out of the memory 15 in the first direction and decodes the data character by character. Step S102 stores a decoded result (a) in the first direction.

Step S103 reads and decodes the bar width data in the second direction character by character. Changing the decoding directions from one to another is controlled by the direction unit 18. The last character decoded in the first direction is the first decoded in the second direction.

Step S104 stores a decoded result (b) in the second direction. Step S105 compares the decoded results (a) and (b) with each other. If the bar code is correctly read, the decoded results (a) and (b) must be equal to each other. Step S106 determines that the bar code has been correctly decoded if the results (a) and (b) agree with each other. If the results (a) and (b) are not equal to each other, step S107 discards the decoded results.

In this way, the first embodiment decodes a bar code in two directions and determines whether or not the bar code has been successfully decoded according to the decoded results in the two directions. This makes the bar code decoding reliability higher than in the prior arts.

Figure 12:
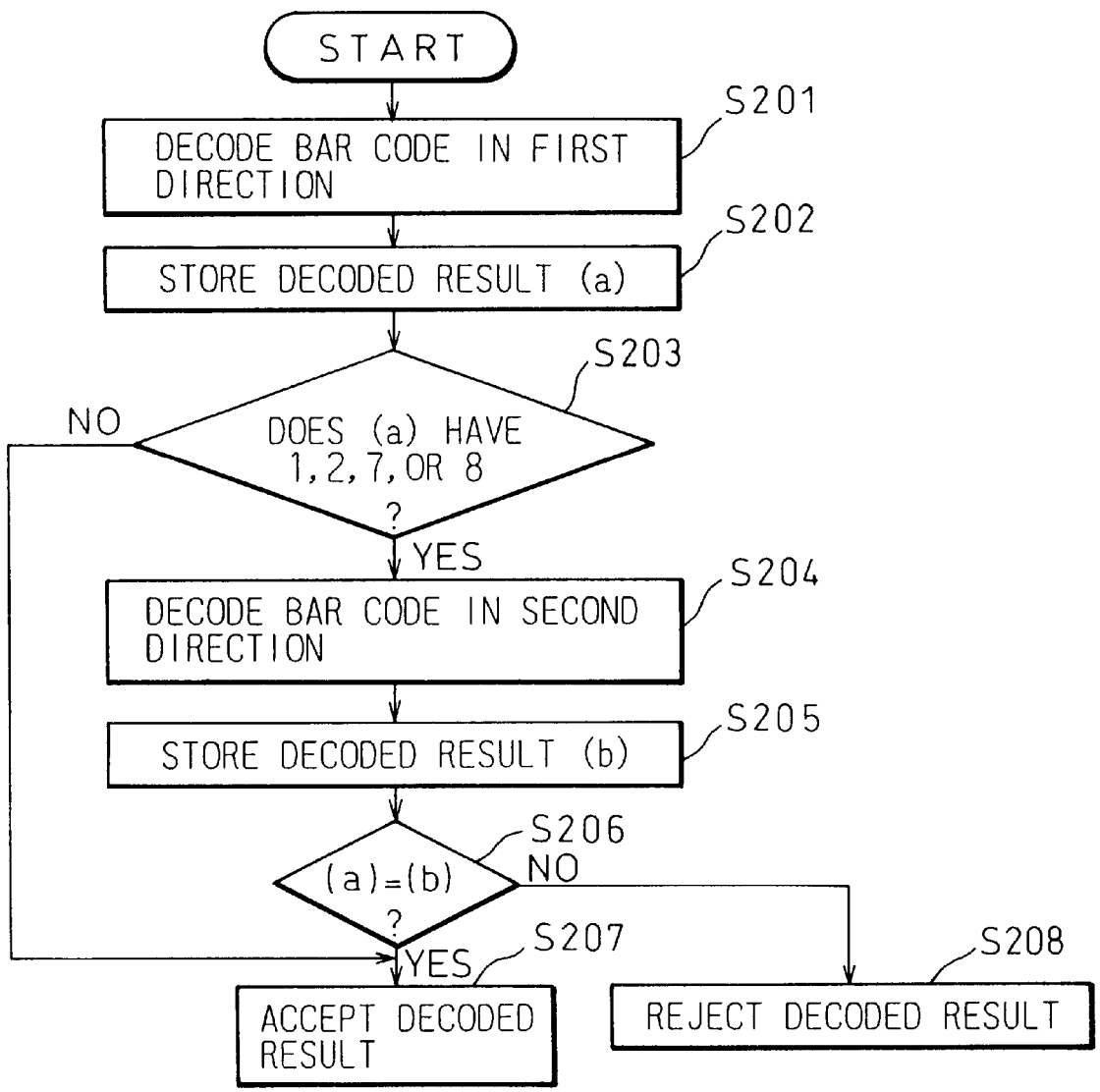
FIG. 12 is a flowchart showing a bar code decoding routine according to a second embodiment of the present invention.

FIG. 12 is a flowchart showing a bar code decoding routine according to a second embodiment of the present invention. This embodiment decodes a bar code in one direction or in two directions depending on whether or not the bar code includes any one of the characters E1, E2, E7, E8, O1, O2, O7, and O8. These characters are called the special characters hereunder.

Any one of the special characters must be decoded according to the actual widths of the bars thereof. To improve the reliability of a decoded result, the widths of the bars of these characters must be corrected according to the widths of the bars of a preceding character already decoded.

On the other hand, normal characters other than the special characters may be decoded according to the delta distances thereof without regard to printing errors. Namely, the normal characters require no bar width correction.

If the decoded preceding character is correct, the bar width correction will be correct. If the decoded preceding character is wrong, the bar width correction will be wrong, and therefore, the decoded result will be wrong.

The embodiment of FIG. 12 solves this problem.

Step S201 decodes a given bar code in the first direction. Step S202 stores a decoded result (a). These steps are the same as those of the first embodiment. Step S203 determines whether or not the decoded result (a) includes any one of the special characters E1, E2, E7, E8, O1, O2, O7, and O8. If it includes none of them, step S207 determines that the decoded result (a) is correct and acceptable.

If the decoded result (a) includes any one of the special characters, the widths of bars of the character will have been corrected according to the widths of bars of a decoded preceding character, and therefore, the bar width correction must be verified. For this purpose, step S204 decodes the bar code data in the second direction, and step S205 stores a decoded result (b) in the second direction.

Figure 13:
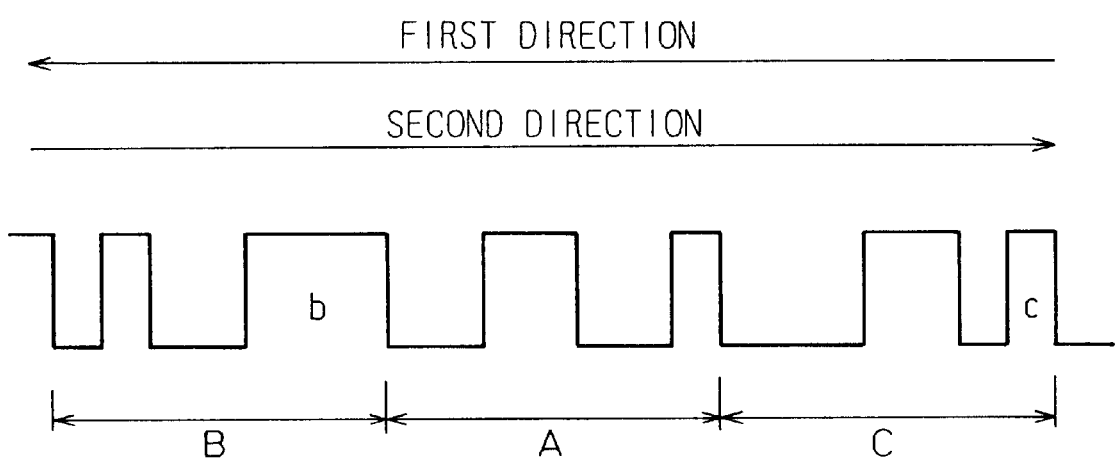
FIG. 13 shows a character sandwiched between two characters.

FIG. 13 shows a character A sandwiched between characters B and C. The character A is O1, i.e., one of the special characters, and therefore, the widths of bars thereof must be corrected according to the widths of bars of a preceding decoded character.

When the bar code is decoded in the first direction in FIG. 13, the character A is decoded after the character B.

Accordingly, the widths of black bars of the character A are corrected according to the width of a black bar b of the character B.

When the bar code is decoded in the second direction, the character A is decoded after the character C. Accordingly, the widths of the black bars of the character A are corrected according to the width of a black bar c of the character C.

In FIG. 13, the black bar used as a reference for correcting the widths of the black bars of the character A is the right black bar of each of the characters B and C.

In this way, the widths of the black bars of the character A are corrected two times according to the widths of the black bars of the characters B and C. Thereafter, the decoded results based on the two corrections are compared with each other. If the comparison provides no difference, it is determined that the bar code has successfully been decoded, or that the bar width corrections were correct.

Returning to FIG. 12, if step S203 determines that the decoded result (a) includes any one of the special characters, step S204 decodes the bar code data in the second direction. Step S205 stores a decoded result (b) in the second direction. Step S206 compares the decoded results (a) and (b) with each other.

If the decoded results (a) and (b) are equal to each other, step S207 determines that the bar code has successfully been decoded. If they disagree with each other, step S208 discards the decoded results because at least one of them must be wrong.

In this way, the second embodiment decodes a bar code in different directions if the bar code contains any character that requires a bar width correction, compares decoded results in the different directions with each other, and determines whether or not the bar code has correctly been decoded.

If a bar code contains none of such special characters, the second embodiment decodes the bar code only in one direction, to shorten a decoding time.

The second embodiment corrects the widths of black bars of the character A of FIG. 13 according to the bar widths of the characters B and C that are adjacent to the character A. This is to avoid the influence of the curvature of a surface on which the bar code is attached. This, however, does not limit the present invention. The bar width correction may be carried out according to, for example, a first decoded character or guard bars.

Figure 14:
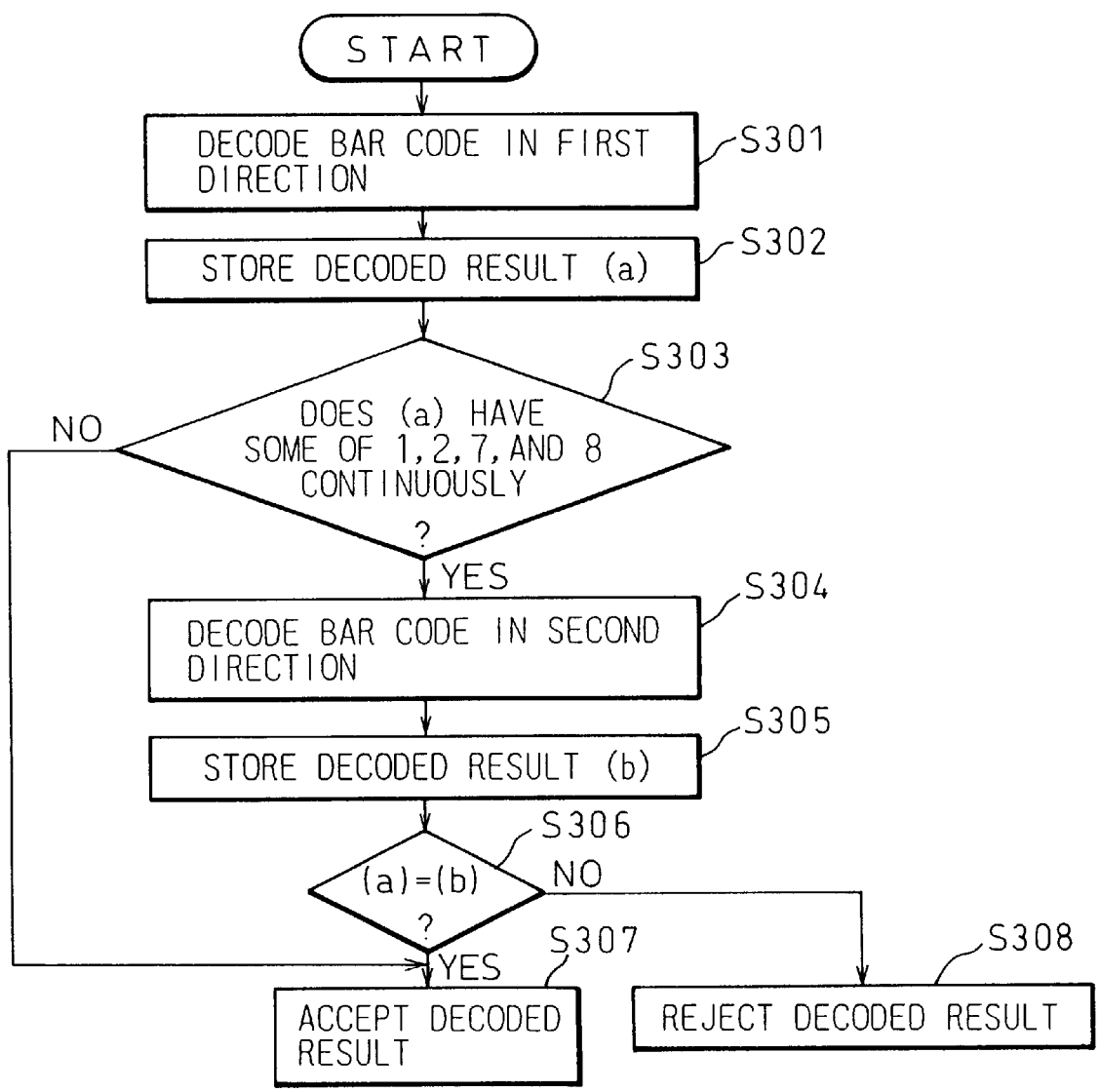
FIG. 14 is a flowchart showing a bar code decoding routine according to a third embodiment of the present invention.

FIG. 14 is a flowchart showing a bar code decoding routine according to the third embodiment of the present invention. This embodiment decodes a given bar code in the first and second directions if the bar code contains any of the special characters E1, E2, E7, E8, O1, O2, O7, and O8 consecutively.

The bar widths of a third character are corrected according to the bar widths of a second character that is in front of the third character. The bar widths of the second character are corrected according to the bar widths of a first character that is in front of the second character. If the bar width correction on the second character includes an error, the error will be expanded in the correction of the third character. As a result, the third character will have a larger error.

The third embodiment decodes a given bar code in the second direction in addition to the first direction if the bar code consecutively includes some of the special characters whose bar widths have been corrected. In this case, the third embodiment corrects the bar widths of a given special character according to the bar widths of two different characters, to improve the reliability of the bar width correction and bar code decoding.

Step S301 decodes a bar code in the first direction, and step S302 stores a decoded result (a). Step S303 determines whether or not the decoded result (a) contains any of the special characters E1, E2, E7, E8, O1, O2, O7, and O8 continuously. If it contains them continuously, step S304 decodes the bar code data in the second direction, and step S305 stores a decoded result (b).

Step S306 compares the decoded results (a) and (b) with each other. If they agree with each other, step S307 determines that the bar code has correctly been decoded. If they disagree with each other, step S308 discards the decoded results because at least one of them is wrong.

If step S303 determines that the decoded result (a) involves no consecutive special characters, step S307 determines that the decoded result (a) is correct.

The third embodiment does not decode a bar code in the second direction if the bar code contains any of the special characters that are not consecutive. This technique, however, does not limit the present invention.

Figure 15:
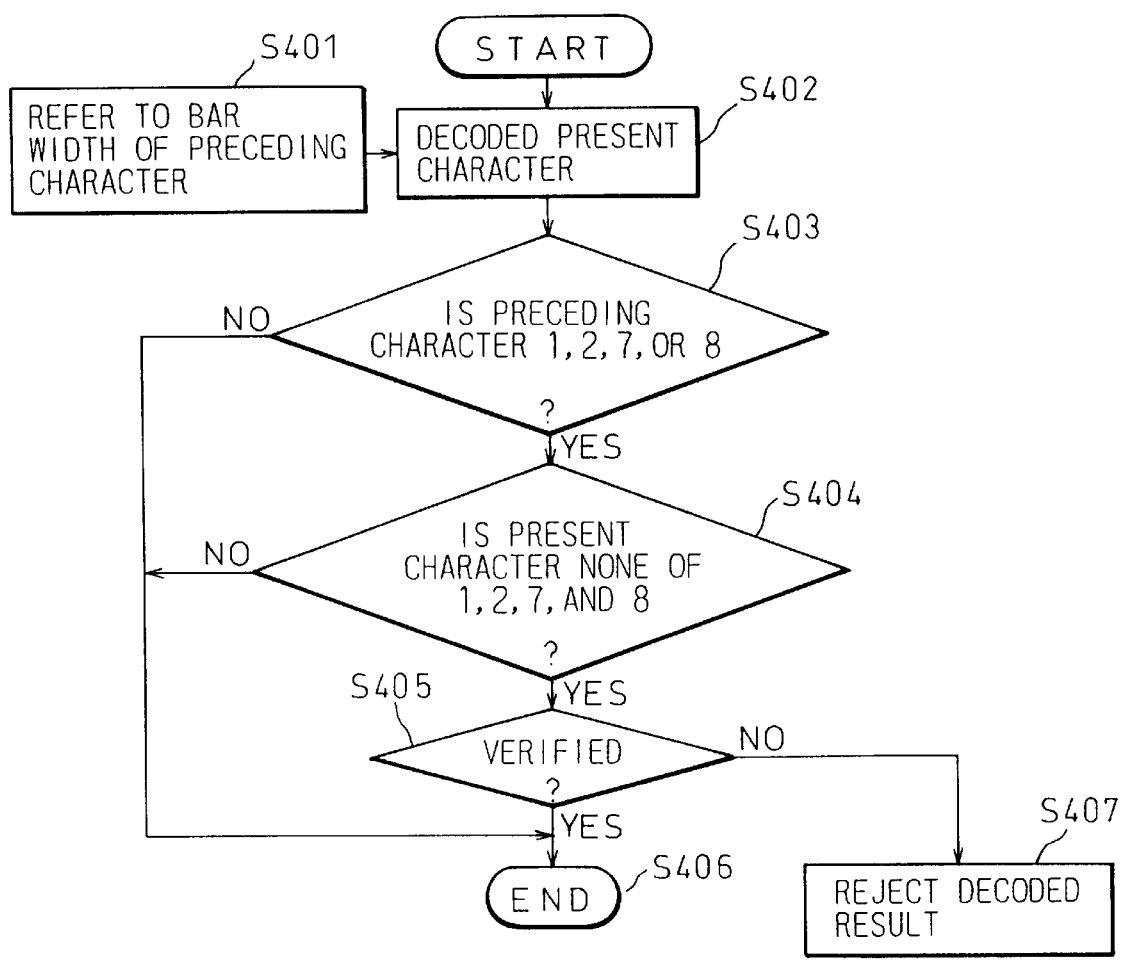
FIG. 15 is a flowchart showing a bar code decoding routine according to a fourth embodiment of the present invention.

FIG. 15 is a flowchart showing a bar code decoding routine according to the fourth embodiment of the present invention. The fourth embodiment tests a first character just decoded to see if it is one of the special characters E1, E2, E7, E8, O1, O2, O7, and O8, and if it is, corrects the bar widths of the first character according to the bar widths of a second character to be decoded. Thereafter, the fourth embodiment again decodes the first character and determines whether or not the decoded results of the first character are unchanged before and after the bar width correction.

Any one of the first to third embodiments decodes a given bar code entirely in both the first and second directions as and when required. This may lengthen the decoding time and deteriorate the operating efficiency of the bar code reader. Accordingly, the fourth embodiment decodes only the special characters in the different directions and determines whether or not the decoded results are equal to each other.

Step S402 decodes a present character. Step S403 determines whether or not a preceding character is one of the special characters E1, E2, E7, E8, O1, O2, O7, and O8. If it is not, the next character is decoded.

If the preceding character is one of the special characters, step S404 determines whether or not the present character is one of the special characters. If the present character is one of them, the bar widths of the preceding character must not be corrected according to the bar widths of the present character because there is a probability of causing a correction error. Therefore, step S406 proceeds to the next character.

If the present character is not one of the special characters in step S404, the bar widths of the preceding character are corrected according to the bar widths of the present character, and the preceding character is again decoded. Step S405 compares the decoded results of the preceding character before and after the correction with each other. If they agree with each other, step S406 proceeds to the next character. If they disagree with each other, step S407 determines that the decoding of the preceding character is wrong.

In this way, the fourth embodiment decodes only a character that must be verified in two directions and determines whether or not the decoded result is acceptable. The fourth embodiment decodes a character that requires no verification in only one direction, to shorten the decoding time.

Figure 16:
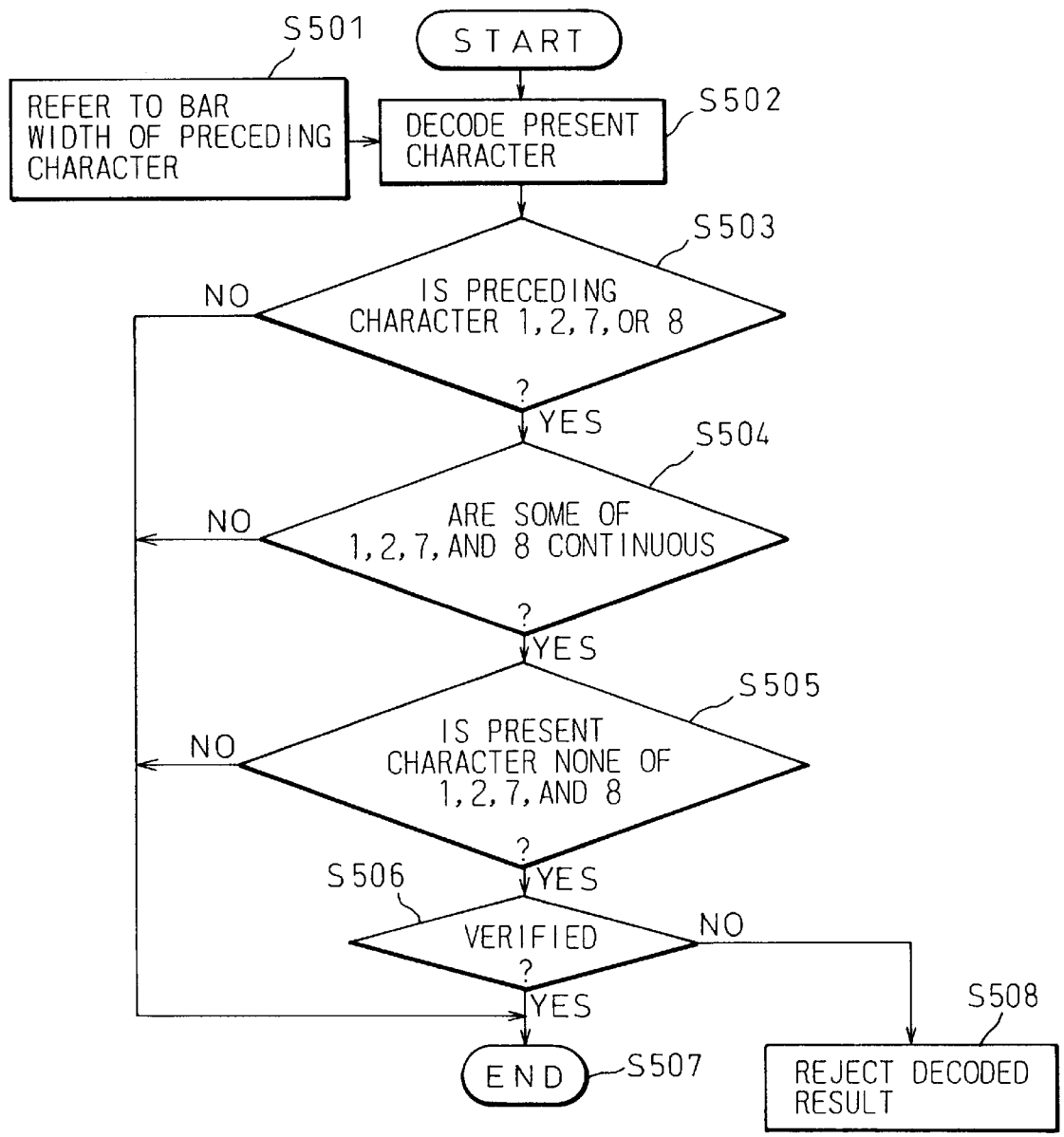
FIG. 16 is a flowchart showing a bar code decoding routine according to a fifth embodiment of the present invention.

FIG. 16 is a flowchart showing a bar code decoding routine according to the fifth embodiment of the present invention. This embodiment repeats the decoding of consecutive special characters according to the decoded result of a present character, to verify the special characters.

Step S502 decodes a present character. Step S503 checks a first preceding character to see if it is one of the special characters E1, E2, E7, E8, O1, O2, O7, and O8. If so, step S504 checks a second preceding character to see if it is one of the special characters. If any one of steps S503 and S504 provides a negative answer, step S507 proceeds to the next character.

If the first and second preceding characters are both one of the special characters, step S505 determines whether or not the present character is not one of the special characters. If the present character is a normal character, step S506 corrects the bar widths of the consecutive special characters according to the bar widths of the present character, decodes the corrected consecutive special characters, and compares the characters before and after the correction with each other. If they agree with each other, step S507 determines that the decoded characters are correct and proceeds to the next character. If they disagree with each other, step S508 determines that the decoded characters are wrong.

If the present character is one of the special characters in step S505, step S507 proceeds to the next character without correcting the bar widths of the preceding special characters.

As explained above, the present invention decodes a bar code in two different directions and compares the decoded results with each other, to determine whether or not the decoded results are correct. The present invention makes the reliability of decoding a bar code better than that of the prior arts.

The present invention corrects a special character two times according to adjacent characters. Decoded results after the two corrections are compared with each other to verify the corrections.

If a decoded preceding character is one of the special characters, the present invention corrects and again decodes the preceding character according to a present character. The decoded results of the preceding character before and after the correction are compared with each other to verify the correction and decoded results. Any normal character, that requires no verification, is decoded only in one direction to reduce a decoding time.

If there are consecutive special characters, they are decoded in different directions, to minimize a propagation of errors in bar width corrections and improve the reliability of bar code decoding.

What is claimed is:

1. A method of decoding a bar code according to reflected light from the bar code, comprising:

detecting bar code data by scanning the bar code only in a first direction;

storing the detected bar code data in storage means;

reading out the stored bar code data from the storage means;

decoding the bar code data read out from the storage means, first decoding the bar code data in the first direction and further second decoding the bar code data in a second direction which is opposite to the first direction, if the decoded result in the first direction includes a special character; and determining if the decoded results in the first and second directions are equal to each other.

2. A method of claim 1, wherein the special character relates to a character whose bar width is corrected, before decoding the character, in each of the first and second directions according to a bar width of a character already decoded in each direction.

3. A method of decoding a bar code according to reflected light from the bar code, comprising:

detecting bar code data by scanning the bar code only in a first direction;

storing the bar code data in storage means;

decoding the bar code data from the storage means, first decoding the bar code data in a first direction and second decoding the bar code data in a second direction opposite to the first direction, if the decoded result in the first direction includes consecutive special characters; and determining if the decoded results in the first and second directions are equal to each other.

4. The method of claim 3, wherein the special characters relate to characters whose bar widths are corrected, before decoding the characters, in each of the first and second directions according to a bar width of a character already decoded in each direction.

5. A method of decoding a bar code according to reflected light from the bar code, comprising:

detecting bar width data of the bar code in the reflected light;

storing the bar width data in storage means;

reading the bar width data from the storage means in a first direction and decoding the bar width data into a first special character that requires bar-width corrections;

determining if the bar widths of a second special character that requires bar-width corrections decoded just before the first special character had been corrected according to the widths of a third character decoded just before the second special character;

if the bar widths of the second special character had been corrected according to the bar widths of the third character, correcting the bar widths of the second special character according to the bar widths of the first special character and again decoding the second special character; and determining if the two decoded results of the second special character are equal to each other.

6. A bar code reader comprising:

a light source;

means for scanning a bar code only in a first direction by emitting light from the light source;

means for receiving reflected light from the bar code and providing a signal representing bar code data;

means for storing the bar code data;

means for decoding the bar code data from the means for storing the bar code data, said means for decoding the bar code data first decoding the bar code data in a first direction, and second decoding the bar code data in a second direction opposite to the first direction if a decoded result of the first decoding in the first direction includes a special character; and means for comparing the decoded results in the first and second directions with each other.

7. The bar code reader of claim 6, wherein the special character relates to a character whose bar width is corrected, before decoding the character, in each of the first and second directions according to a bar width of a character already decoded in each direction.

8. A bar code reader comprising:

a light source;

means for scanning a bar code only in a first direction by emitting light from the light source;

means for receiving reflected light from the bar code and providing a signal representing bar code data;

means for decoding the bar code data read from the means for storing the bar code data, first decoding the bar code data in a first direction and second decoding the bar code data in a second direction which is opposite to the first direction, if a decoded result of the first decoding includes consecutive special characters; and means for comparing the decoded results in the first and second directions with each other.

9. The bar code reader of claim 8, wherein the special characters relate to characters whose bar widths are corrected, before decoding the characters, in each of the first and second directions according to a bar width of a character already decoded in each direction.

10. A bar code reader comprising:

a light source;

means for emitting light from the light source outside;

means for receiving reflected light from a bar code and providing a signal representing bar code data;

means for storing the bar code data;

means for decoding the bar code data in a first direction into a first special character that requires bar-width corrections, and if the bar widths of a second special character had been corrected according to the bar widths of a third special character that requires bar-width corrections decoded just before the second special character, correcting the bar widths of the second special character according to the bar widths of the first special character, and again decoding the second special character; and means for comparing the two decoded results of the second special character with each other.

11. A method of decoding a bar code according to reflected light from the bar code, comprising:

detecting bar code data by scanning the bar code only in a first direction;

storing the detected bar code data in storage means;

reading out the stored bar code data from the storage means;

decoding the bar code data read out from the storage means, first decoding the bar code data in a first direction and second decoding the bar code data in a second direction which is opposite to the first direction; and determining if the decoded results in the first and second directions are equal to each other.

* * * * *